US008674552B2

(12) United States Patent
Shinoda et al.

(10) Patent No.: US 8,674,552 B2
(45) Date of Patent: Mar. 18, 2014

(54) CONTACTLESS POWER RECEPTION CIRCUIT AND CONTACTLESS POWER TRANSMISSION SYSTEM

(75) Inventors: Satoshi Shinoda, Otsu (JP); Takahide Sano, Kyotanabe (JP)

(73) Assignee: Murata Manufacturing Co., Ltd., Kyoto-Fu (JP)

( * ) Notice: Subject to any disclaimer, the term of this patent is extended or adjusted under 35 U.S.C. 154(b) by 505 days.

(21) Appl. No.: 13/073,570

(22) Filed: Mar. 28, 2011

(65) Prior Publication Data

US 2011/0210620 A1    Sep. 1, 2011

Related U.S. Application Data

(63) Continuation of application No. PCT/JP2008/059337, filed on May 21, 2009.

(30) Foreign Application Priority Data

Sep. 29, 2008 (JP) ................................. 2008-250922

(51) Int. Cl.
*H01F 27/42* (2006.01)
*H01F 37/00* (2006.01)
*H01F 38/00* (2006.01)

(52) U.S. Cl.
USPC ........................................................ 307/104

(58) Field of Classification Search
USPC ................................... 307/104; 320/108
See application file for complete search history.

(56) References Cited

U.S. PATENT DOCUMENTS

| 7,505,794 | B2 | 3/2009 | Watanabe et al. |
| 2007/0155442 | A1 | 7/2007 | Watanabe et al. |
| 2007/0228833 | A1* | 10/2007 | Stevens et al. ................... 307/45 |
| 2007/0246546 | A1 | 10/2007 | Yoshida |
| 2009/0160652 | A1 | 6/2009 | Watanabe et al. |

FOREIGN PATENT DOCUMENTS

| CN | 1652455 A | 8/2005 |
| CN | 18886879 A | 12/2006 |
| CN | 101075746 A | 11/2007 |

(Continued)

OTHER PUBLICATIONS

The Notice on the Second Office Action issued by the State Intellectual Property Office of the People's Republic of China on May 29, 2013, which corresponds to Chinese Patent Application No. 200980138581.2 and is related to U.S. Appl. No. 13/073,570 with translation.

(Continued)

*Primary Examiner* — Carlos Amaya
(74) *Attorney, Agent, or Firm* — Studebaker & Brackett PC

(57) ABSTRACT

This disclosure provides a contactless power reception circuit that includes a power reception part, a voltage rectifying part, a voltage transforming part and a load modulation part. The voltage transforming part includes a smoothing capacitor, a DCDC converter and a backflow prevention device. The power reception part is couplable with an electromagnetic field adjacent to the contactless power reception circuit. The rectifying part rectifies a voltage output from the power reception part, the voltage transforming part transforms rectified voltage from the rectifying part, and the load modulation circuit conducts a load modulation while signals are transmitted. The smoothing capacitor smoothes a voltage input to the voltage transforming part, the DCDC converter transforms voltage smoothed by the smoothing capacitor, and the backflow prevention device prevents backflow of charge from the smoothing capacitor while the signals are transmitted to a contactless power transmission circuit.

18 Claims, 9 Drawing Sheets

(56) References Cited

FOREIGN PATENT DOCUMENTS

| EP | 1 752 914 A1 | 2/2007 |
|---|---|---|
| JP | 03-072752 | 3/1991 |
| JP | 2006-060909 A | 3/2006 |
| JP | 2007-288718 A | 11/2007 |
| WO | 2005/072065 A2 | 8/2005 |

OTHER PUBLICATIONS

The Notice on the Third Office Action issued by the State Intellectual Property Office of the People's Republic of China on Aug. 21, 2013, which corresponds to Chinese Patent Application No. 200980138581.2 and is related to U.S. Appl. No. 13/073,570 with translation.

International Search Report; PCT/JP2009/059337; Sep. 1, 2009.

"Notice on the First Office Action" dated Dec. 10, 2012, which issued in the State Intellectual Property Office of the People's Republic of China and corresponds to Chinese Patent Application No. 200980138581.2 and is related to U.S. Appl. No. 13/073,570 with English language summary.

An Office Action, "Decision on the Rejection," issued by the Patent Office of the State Intellectual Property Office of the People's Republic of China on Dec. 4, 2013, which corresponds to Chinese Patent Application No. 200980138581.2 and is related to U.S. Appl. No. 13/073,570 with translation.

* cited by examiner

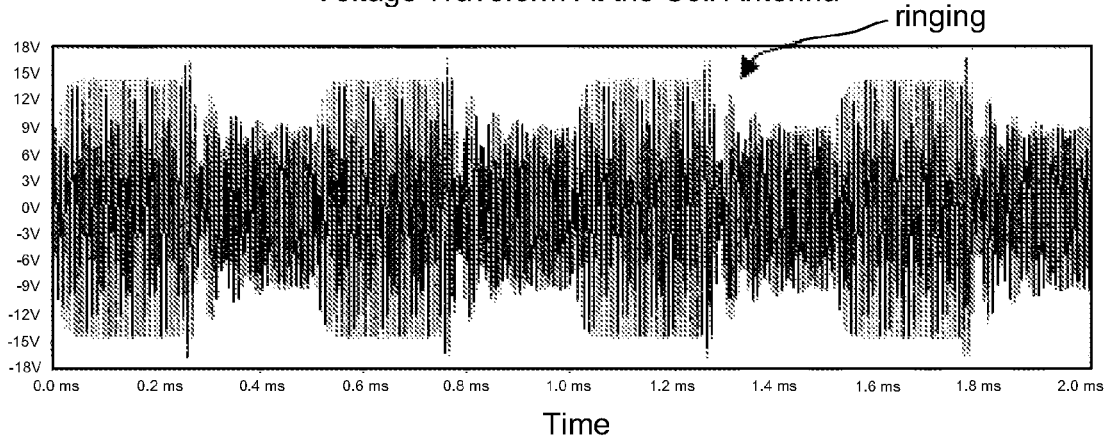
FIG.7A  C2: not provided
C1 = 50μF
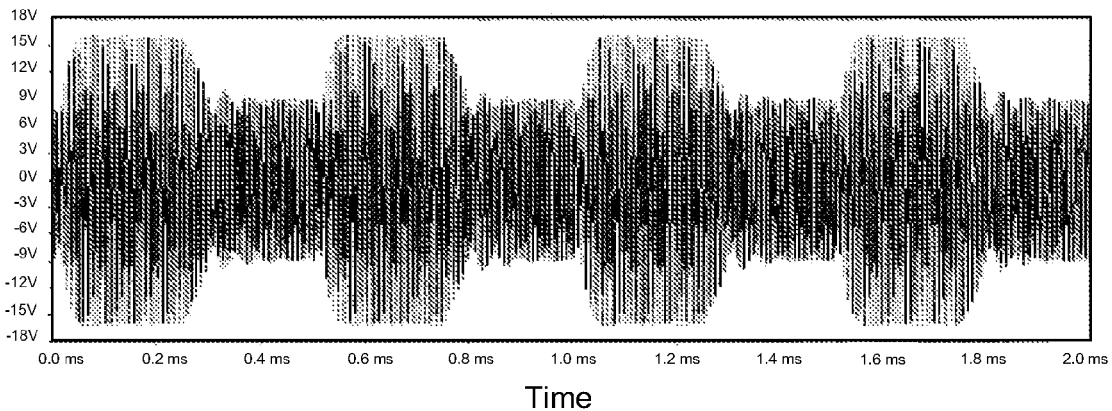
FIG.7B  C2 = 0.5μF
C1 = 49.5μF

CONTACTLESS POWER RECEPTION CIRCUIT AND CONTACTLESS POWER TRANSMISSION SYSTEM

CROSS REFERENCE TO RELATED APPLICATIONS

The present application is a continuation of International Application No. PCT/JP2009/059337, filed May 21, 2009, which claims priority to Japanese Patent Application No. 2008-250922 filed Sep. 29, 2008, the entire contents of each of these applications being incorporated herein by reference in their entirety.

TECHNICAL FIELD

The present invention relates to a contactless power reception circuit which receives a power supply by coupling with an adjacent electromagnetic field and a contactless power transmission system including the contactless power reception circuit and a contactless power transmission circuit which generates the adjacent electromagnetic field.

BACKGROUND ART

In a RFID using a contactless power supply, a contactless power reception circuit is provided in a wireless tag side. The contactless power reception circuit receives power from an adjacent electromagnetic field of a reader-writer for example, by coupling, and drives an internal circuit thereof. In such a RFID system, the wireless tags may transmit signals by a load modulation communication to the reader-writer for the purpose of an authentication. See, Japanese Unexamined Patent Application Publication No. 2007-288718.

FIG. 1 is a circuit diagram showing an example of rough configuration for a conventional contactless power reception circuit using the load modulation communication.

A receiver part 102 includes a coil antenna and is coupled with the adjacent electromagnetic field of the reader-writer. A rectifier part 103 includes a diode and rectifies a generated voltage signal at the receiver part 102. A voltage regulator 104 regulates a rectified voltage signal at the rectifier 103, and transforms to a specified voltage. A power supply part 105 utilizes an output voltage from the voltage regulator 104 as a driving voltage for an internal circuit. DATA reception part 107 demodulates a reception signal from the reader-writer. A clock generator 108 generates a clock signal based on the reception signal from the reader-writer. A signal processor 109 generates a transmission signal to the reader-writer. A load modulator part 106 switches a load value based on the transmission signal generated at the signal processor 109. By switching the load value, status of a power supply from the adjacent electromagnetic field changes, and a voltage level of the coil antenna at reader-writer side changes. Accordingly, the reader-writer can detect the transmission signal from the wireless tags based on changes of the voltage level. At the wireless tags, only a power supply enough for driving the signal processor is required, thus a power transmitted from the voltage regulator 104 to the power supply part 105 is in the order of mW.

SUMMARY

The present disclosure provides a contactless power reception circuit and a contactless power transmission system that can suppress an increase of communication error, a decrease of transmission rate, realize compact in size, and/or have low heat generation.

A contactless power reception circuit consistent with the disclosure includes a power reception part, a voltage rectifying part, a voltage transforming part and a load modulation part. The voltage transforming part includes a DCDC converter, a smoothing capacitor and a backflow prevention device. The power reception part is couplable with an adjacent electromagnetic field of a contactless power transmission circuit. The voltage rectifying part is configured to rectify voltage from the power reception part. The voltage transforming part is configured to transform rectified voltage from the voltage rectifying part and supply the transformed voltage to a power reception load. While signals are transmitted to the contactless power transmission contactless power reception circuit, the load modulation part changes total impedance in the circuit by conducting a load modulation. The DCDC converter transforms rectified voltage from the voltage rectifying part, the input smoothing capacitor smoothes the input voltage, and the backflow prevention device prevents backflow of a charge from the smoothing capacitor while signals are transmitted.

If a backflow prevention device is not provided, a discharge from the input smoothing capacitor can cause signal waveform deformation, which can interfere with the load modulation communication during the signal transmission. However, since a backflow prevention device is provided, discharge from the smoothing capacitor is prevented and the signal waveform deformation during the load modulation communication can be suppressed. After the load modulation communication is conducted, a usual power transmission through DCDC converter can be conducted without conducting the load modulation or blocking the backflow of a charge.

In a more specific embodiment of the disclosure, a load modulation resistor, a switch for the load modulation and a signal processing part may be provided at the load modulation part. A first end, or terminal of the load modulation resistor can be connected to a point between the voltage rectifying part and the voltage transforming part. The switch for the load modulation can be connected between a second end of the load modulation resistor and ground. The signal processing part can be configured to obtain an input-driving voltage at a point between the voltage rectifying part and the voltage transforming part, and to conduct the switching for the load modulation.

In another more specific embodiment of the disclosure, a backup smoothing capacitor may be provided such that one end, or terminal of the backup smoothing capacitor is connected to a point between the load modulation part and the voltage transforming part, and the other end, or terminal thereof is connected to ground.

If a backup smoothing capacitor is not provided and a parasitic capacitance of the power reception part, for example, is small, a ringing in the signal waveform may appear during the load modulation communication. Hence, some embodiments may be provided with a backup smoothing capacitor having a capacitance properly set at a front stage of the backflow prevention device to properly adjust the impedance of the transforming part as seen from the load modulation part and suppress ringing in the signal waveform.

In yet another more specific embodiment of the disclosure, a capacitor having large capacitance value, for example, larger than the smoothing capacitor, may be provided such that one end, or terminal thereof is between the voltage transforming part and the power reception load, and another end, or terminal is provided at ground. Thereby, output variation of the DCDC converter can be suppressed during the load modulation communication.

The backflow prevention device may be a switch for preventing backflow that disconnects electrical connection between the voltage rectifying part and the voltage transforming part during the load modulation.

In another more detailed embodiment, the backflow prevention device may be a diode for preventing backflow of charge.

In a contactless power transmission system according to an embodiment, the above described contactless power reception circuit can be provided with a contactless power transmission circuit that is configured to generate the adjacent electromagnetic field during operation of the power supply changing by the load modulation and detect reception signal by the change of the power supply state.

BRIEF DESCRIPTION OF DRAWINGS

FIG. 7A is a graph of a voltage waveform at a coil antenna of the power transmission system without a backup smoothing capacitor.

FIG. 7B is a graph of a voltage waveform at a coil antenna of the power transmission system with a backup smoothing capacitor.

DETAILED DESCRIPTION

The inventors have realized that when a load modulation communication is conducted with a capacitor having a large capacitance such as in a range of several tens to several hundreds of µF, the capacitor discharges at every load modulation and the waveform of the voltage signal is deformed, which subsequently causes problems such as a communication error and a decreased transmission rate.

To suppress the waveform deformation of the voltage signals, decreasing a time constant by decreasing resistance of the load modulation has been considered. In that case, however, a current running through the load modulation resistor can become large, resulting in large power consumption. Decreasing the time constant by disposing the load modulation resistors in parallel is also considered, but that can cause enlargement of the size and an increase in cost.

Further, when a contactless power supply is used for quick recharging a laptop computer or other mobile equipment, for example, in a range of several to several tens of W, transforming a voltage with a voltage regulator can cause a problem of large heat generation.

In order to conduct voltage transformation while suppressing the heat generation, a DCDC converter can be used instead of the voltage regulator. However, if the level of input voltage signals varies largely, it becomes difficult for the DCDC converter to operate stably. Therefore, in order to use the DCDC converter for a contactless power reception circuit, input voltage signals to the DCDC converter needs to be smoothed with a capacitor having a relatively large capacitance value in a range of several tens to several hundreds of µF.

Figure 1:
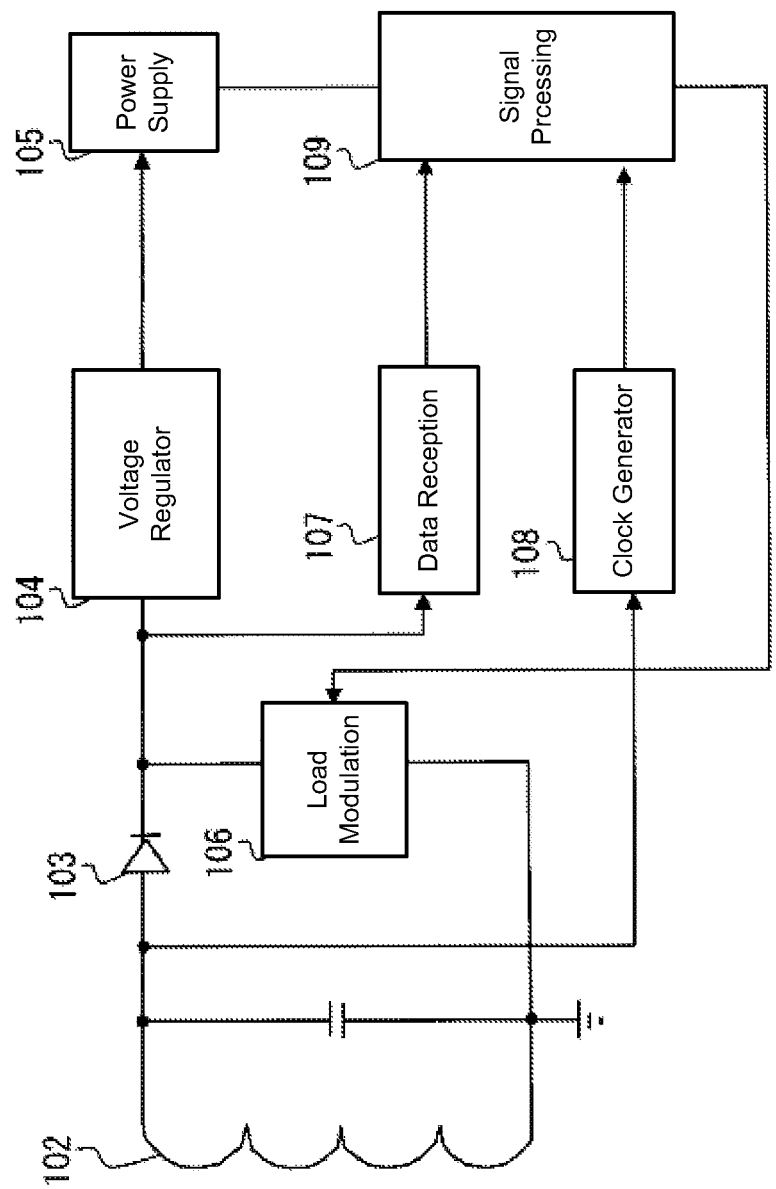
FIG. 1 is a schematic diagram of a conventional contactless power reception circuit.
Figure 2:
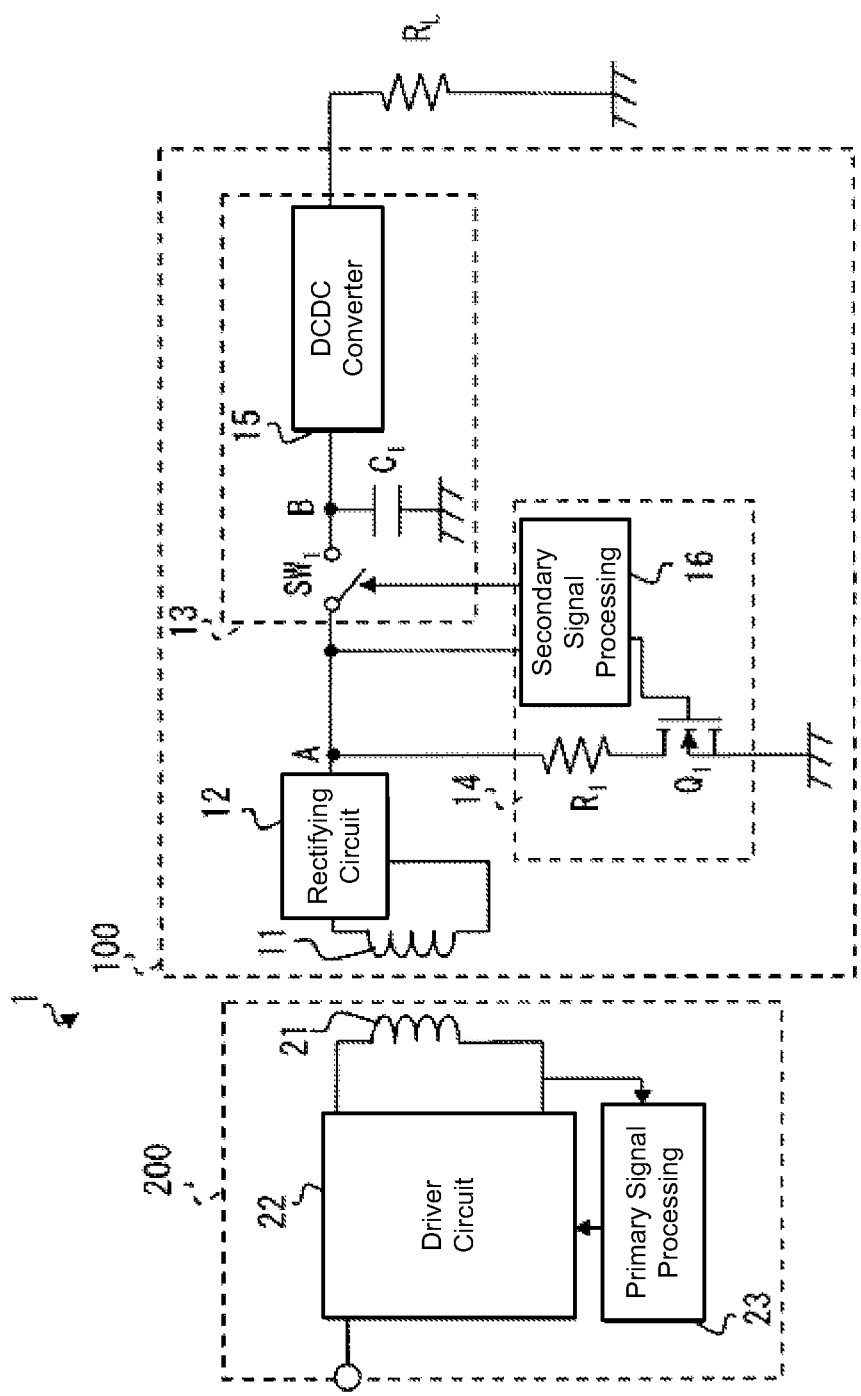
FIG. 2 is a schematic diagram of a first exemplary embodiment showing a contactless power transmission system comprising a contactless power reception circuit and a contactless power transmission circuit.

A contactless power reception circuit that addresses these issues will now be described. With reference to FIG. 2, a schematic diagram of a contactless power transmission system 1 according to a first exemplary embodiment includes a contactless power reception circuit 100 and a contactless power transmission circuit 200.

The contactless power transmission circuit 200 includes coil antenna 21, a driver circuit 22 and a primary signal processing part 23. The driver circuit 22 supplies power to the coil antenna 21. The coil antenna 21 generates the adjacent electromagnetic field by the supplied power from the driver circuit 22. The primary signal processing part 23 detects transmission signal from the contactless power reception circuit 100 based on change of the voltage level at the coil antenna 21 which is caused by change of power supply state of the adjacent electromagnetic field.

The contactless power reception circuit 100 includes a coil antenna 11 as a power reception part, a rectifying circuit 12 as a rectifying part, a voltage transforming circuit 13 as a voltage transforming part, and a load modulation circuit 14 as a load modulation part. The coil antenna 11 is a power reception part according to the present embodiment and is coupled with the adjacent electromagnetic field of the coil antenna 21 at primary side. The rectifying circuit 12 is a voltage rectifying part, which rectifies high frequency signals transmitted from the coil antenna 11. The voltage transforming circuit 13 includes a backflow prevention device, which in this embodiment is a switch $SW_1$, an input smoothing capacitor $C_1$ and a DCDC converter 15. The backflow prevention switch $SW_1$ may be a relay switch or FET switch being controlled ON/OFF by a signal transmitted from a secondary signal processing part 16. The backflow prevention switch SW' is preferably disposed, or provided between the input smoothing capacitor $C_1$ and a load modulation resistor $R_1$ of a load modulation circuit 14. According to the first exemplary embodiment, the backflow prevention switch $SW_1$ is preferably provided between connection end B for the input smoothing capacitor $C_1$ (smoothing capacitor) and a connection end A for a load modulation resistor $R_1$. The input smoothing capacitor $C_1$ includes a first terminal provided at a point between the backflow prevention switch $SW_1$ and the DCDC converter 15, and a second terminal at ground, and smoothes an input voltage to DCDC converter 15. DCDC converter 15 transforms input voltage (step up or step down) and transmits to a power reception load $R_L$. The power reception load $R_L$ may be a circuit including a rechargeable battery, for example, and charges the rechargeable battery with a voltage transmitted from the voltage transforming circuit 13 and operates at a generated voltage by the rechargeable battery as an operating voltage.

The load modulation circuit 14 is a load modulation part, which includes a load modulation resistor $R_1$, a load modulation switch Q1 and a secondary signal processing part 16, and changes total impedance of the contactless power reception circuit 100 while the load modulation communication is conducted. A first end of the load modulation resistor $R_1$ is connected to the connection point A between the rectifying circuit 12 and the voltage transforming circuit 13. The load modulation switch Q1 is provided between a second end of the load modulation resistor $R_1$ and a ground. The secondary signal processing part 16 receives input-operating voltage from a point between the rectifying circuit 12 and the voltage transforming circuit 13, and conducts switching the load modulation switch Q1.

The contactless power transmission system 1 operates by switching to a load modulation communication mode or to a power transmission mode. The contactless power transmission circuit 200 switches to the load modulation communication mode at a fixed time interval during operation of the power transmission mode and suppresses the supplying voltage to the coil antenna 21 compared with that of the power transmission mode. Meanwhile, the secondary signal processing part 16 detects input operating voltage, and the contactless power reception circuit 100 evaluates and determines whether the detected voltage is the voltage for the load modulation communication mode or for the power transmission mode and conducts operation based on the determined mode.

Figure 3:
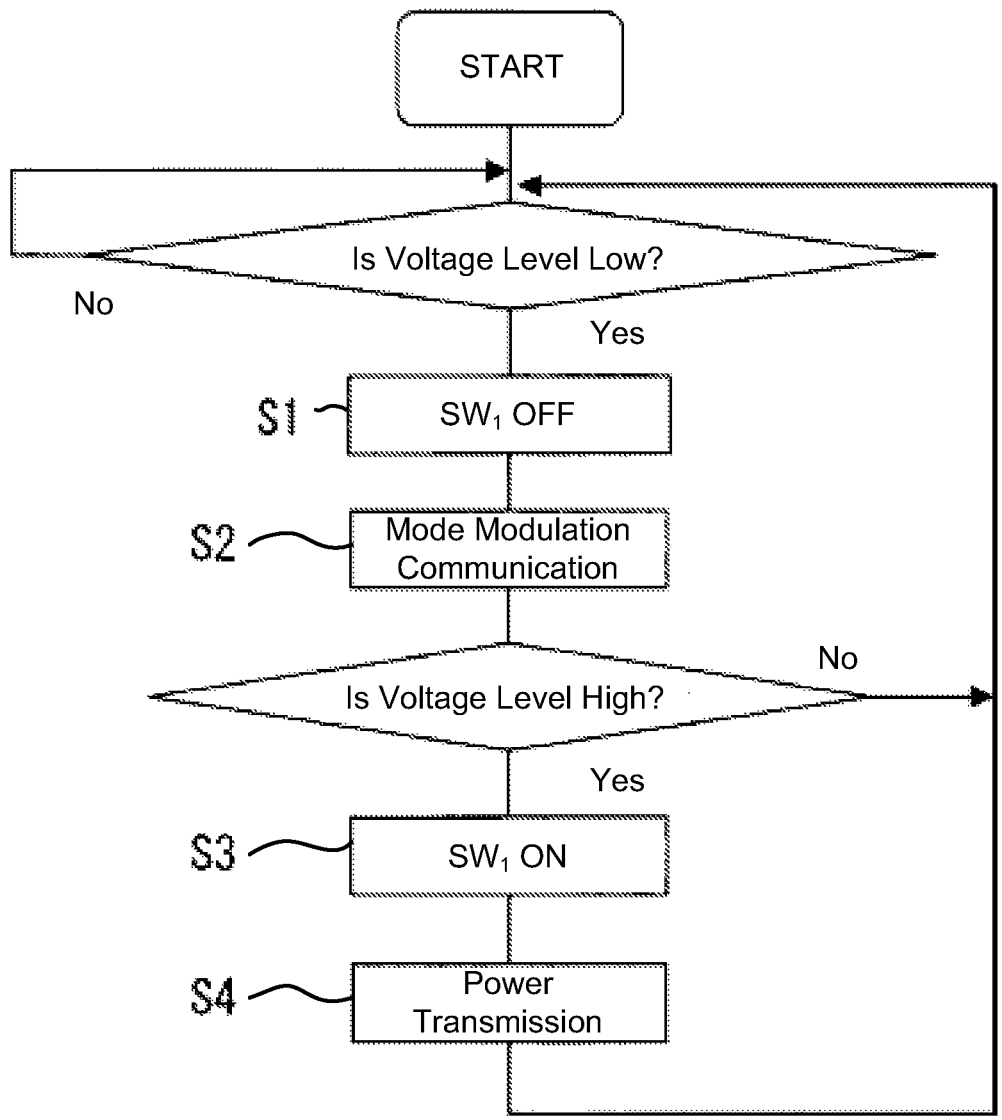
FIG. 3 is a flowchart of an exemplary operational flow of the power transmission system.

FIG. 3 is an example of operational flow of the contactless power reception circuit 100.

The contactless power reception circuit 100 regards the mode as the load modulation communication mode when the input operating voltage at the secondary signal processing part 16 is lower than a specified value, and the secondary signal processing part 16 switches the backflow prevention switch $SW_1$ to OFF (i.e., the "Yes" path is taken to S1). Accordingly, the load modulation circuit 14 and the rectifying circuit 12 are electrically disconnected from the input smoothing capacitor $C_1$, and a backflow of a charge from the input smoothing capacitor $C_1$ is prevented.

Then, the secondary signal processing part 16 produces a secondary terminal specific identification code, for example, conducts load modulation communication by controlling the load modulation switch Q1 with ON/OFF control while using the identification code as transmission code, and transmits the identification code to the contactless power transmission circuit 200 (S2). The impedance as total of the contactless power reception circuit 100 changes by controlling the load modulation switch Q1 with ON/OFF control, then the power supply state from the coil antenna 21 to the coil antenna 11 changes and the voltage level at the coil antenna 21 of the contactless power transmission circuit 200 changes in response to signals transmitted from the contactless power reception circuit 100. Accordingly, the signals transmitted from the contactless power reception circuit 100 can be detected at the primary signal processing part 23 of the contactless power transmission circuit 200.

When the identification code is authenticated at the contactless power transmission circuit 200 side, the contactless power transmission circuit 200 starts operation of the power transmission mode, and increases the supplying voltage to the coil antenna 21. Thereby, the input-operating voltage at the secondary signal processing part 16 of the contactless power reception circuit 100 exceeds the specified value, then the secondary signal processing part 16 switches the backflow prevention switch $SW_1$ and the load modulation switch Q1 to ON (i.e., the "Yes" path is taken to S3). Thereby, a rectified signal is sent via the backflow prevention switch $SW_1$ and smoothed by the input smoothing capacitor $C_1$. Then, voltage transforming action is conducted by DCDC converter 15, and the specified voltage is supplied to the power reception load $R_L$ and the rechargeable battery is charged up, for example (S4).

Through the above described operational flow, the contactless power transmission system 1 operates by switching to a load modulation communication mode or to a power transmission mode.

Figure 4A:
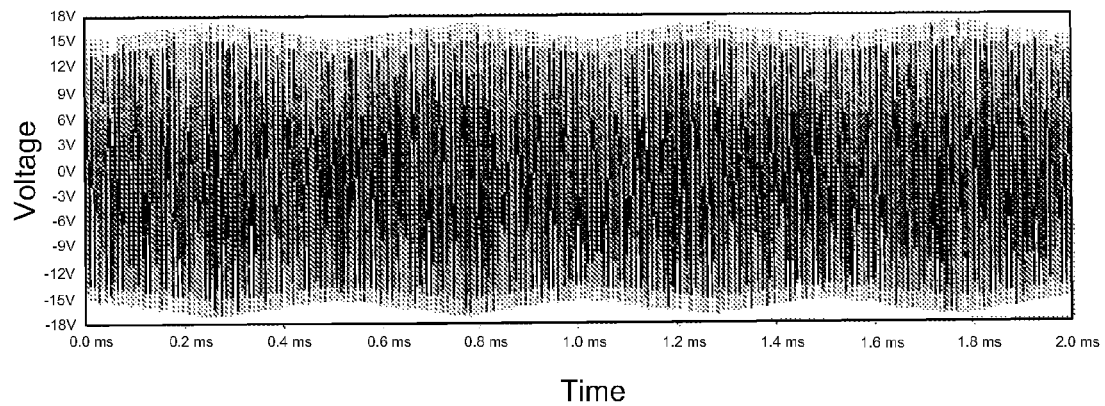
FIG. 4A is a graph of a voltage waveform at a coil antenna of a conventional power transmission system configuration.
Figure 4B:
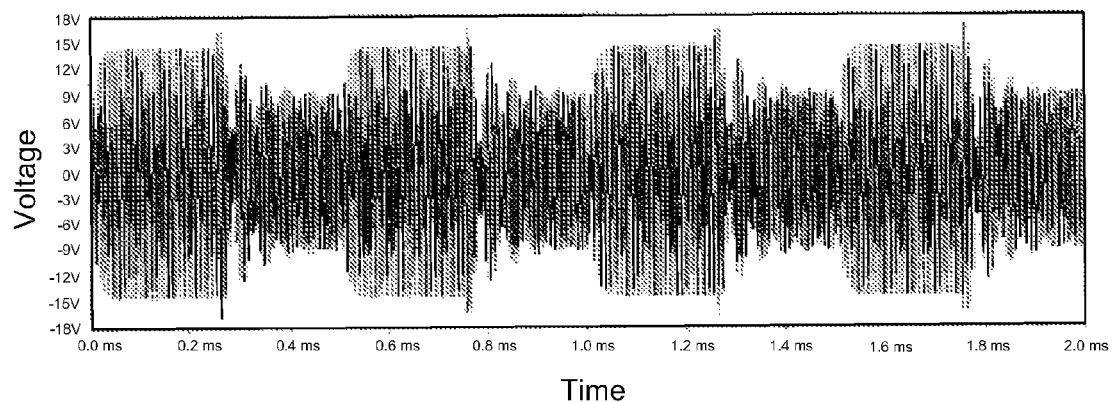
FIG. 4B is a graph of a voltage waveform at a coil antenna of a power transmission system configuration according to the first exemplary embodiment.

FIGS. 4A and 4B show changes of the voltage level at the coil antenna 21, comparing that of the power transmission system according to the first exemplary embodiment including a backflow prevention device with that of an example of a conventional configuration.

FIG. 4A is a graph showing changes of voltage level at the coil antenna 21 of the conventional configuration that does not include a backflow prevention device (e.g., switch $SW_1$). FIG. 4B is a graph showing changes of voltage level at the coil antenna 21 of the configuration of the present embodiment which includes the backflow prevention switch $SW_1$. Herein, exemplary component values are used, for example, the ON/OFF control of the load modulation switch Q1 is set to duty-cycle 0.5, the data rate of the load modulation is set to 2 kbps, the load modulation resistor $R_1$ is set to 20Ω and the input smoothing capacitor $C_1$ is set to 50 μF.

As shown in FIG. 4A, since the backflow prevention switch $SW_1$ is not provided in the case of the conventional configuration, waveform deformation in the voltage waveform is caused and a modulation depth which is a ratio of a high level voltage to a low level voltage becomes about 6.0%. Meanwhile, as shown in FIG. 4B as an example with the configuration of the present embodiment, since the backflow prevention switch $SW_1$ is provided and the load modulation part and the voltage transforming part are electrically disconnected in between, the modulation depth accompanied by ON/OFF control of the load modulation switch becomes about 27.1%, and the waveform deformation is substantially suppressed.

As described above, when the contactless power reception circuit of the present embodiment is used, even if the DCDC converter and the input smoothing capacitor of a large capacitance value are used, the waveform deformation in the voltage waveform is suppressed, thereby suppressing an increase of communication error and a decrease of transmission rate.

When a power transmission value per unit of time is changed in the commonly-used contactless power reception circuit, it is required to change the design of the DCDC converter. In the case of conventional circuit configurations, the load modulation circuits need to be re-designed every time when the input impedance of the DCDC converter is changed. However, in the case of circuit configuration according to the present embodiment, the load modulation circuit side is not affected by the input impedance of the DCDC converter because the backflow prevention switch is provided, therefore there is a such merit as well that re-design of the load modulation circuit is not required even when a power transmission value per unit of time is changed.

A contactless power reception circuit according to a second exemplary embodiment will now be described with reference to FIG. 5. The second exemplary embodiment differs from the first exemplary embodiment in the point that the second exemplary embodiment utilizes a backflow prevention diode instead of a backflow prevention switch as a backflow prevention device. Hereafter, the same reference numerals are used for a similar configuration to the first exemplary embodiment, and a detailed description of such parts is provided above.

Figure 5:
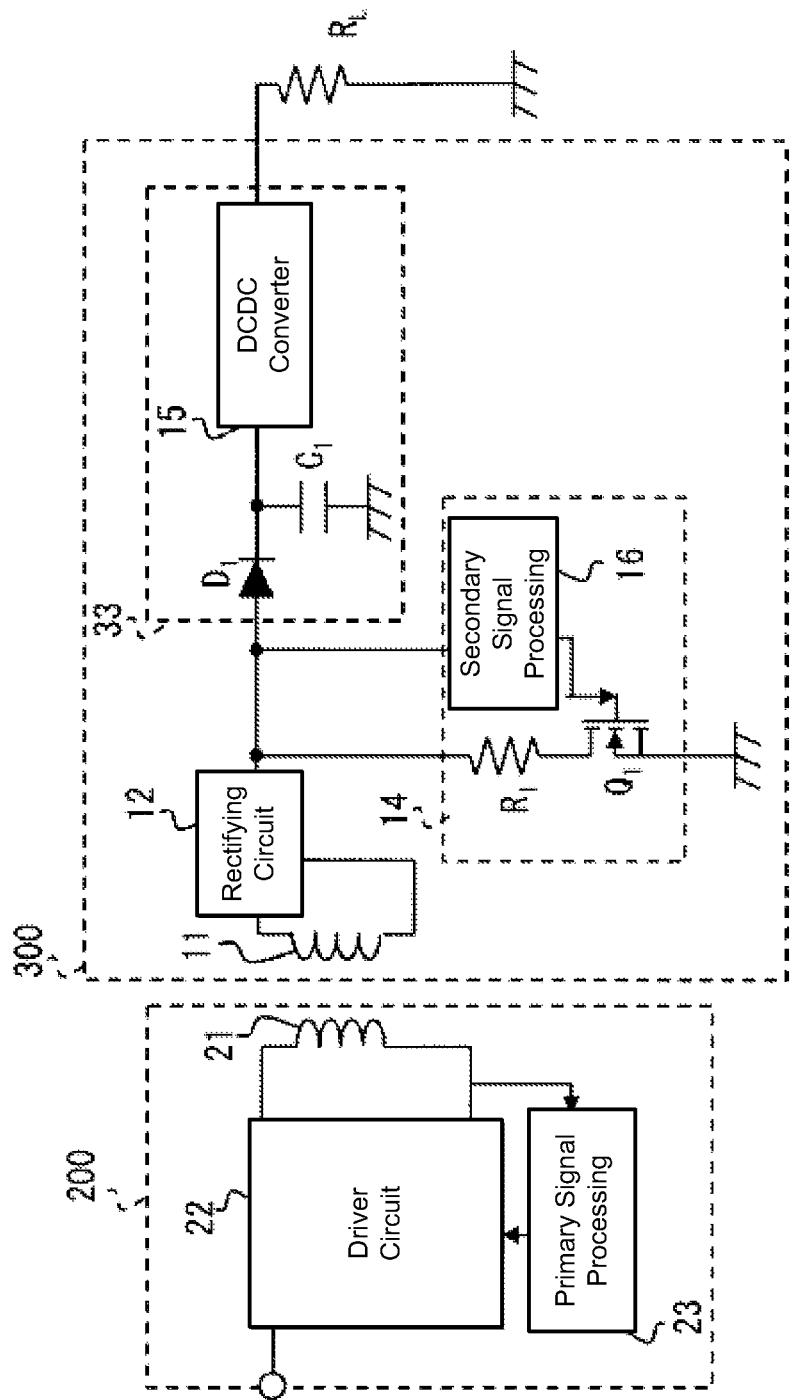
FIG. 5 is a schematic diagram of a contactless power transmission system comprising a contactless power reception circuit and a contactless power transmission circuit according to a second exemplary embodiment.

FIG. 5 is a schematic diagram showing a contactless power transmission system comprising a contactless power reception circuit 300 and a contactless power transmission circuit 200.

The contactless power reception circuit 300 includes a coil antenna 11, a rectifying circuit 12, a voltage transforming circuit 33 and a load modulation circuit 14. The voltage transforming circuit 33 is a voltage transforming part and includes a backflow prevention diode $D_1$, an input smoothing capacitor $C_1$ and a DCDC converter 15. With this configuration, a backflow of a charge from the input smoothing capacitor $C_1$ is prevented by a rectifying function of the backflow prevention diode $D_1$ even at a load modulation communication mode.

Although a charge of the input smoothing capacitor $C_1$ attempts to flow backward by the ON/OFF switching controls of the load modulation switch Q1 during the load modulation communication mode, the backflow charge is blocked at the backflow prevention diode $D_1$, and is not sent to the load modulation circuit 14. Accordingly, the modulation depth accompanied by ON/OFF control of the load modulation switch is increased and the waveform deformation is substantially suppressed.

According to this second exemplary embodiment, a backflow of a charge from the input smoothing capacitor $C_1$ is prevented by the backflow prevention diode $D_1$ as a backflow prevention device without conducting a control at secondary signal processing part 16, and therefore the control is simplified. A similar advantage can be obtained as well by using a varistor instead of the diode.

In this embodiment, an example is shown of a configuration such that the operating voltage for the secondary signal processing part is taken from a front stage of the backflow prevention diode $D_1$. However, in the case of using backflow prevention diode $D_1$, a power flows at a back stage of the backflow prevention diode $D_1$ during the load modulation communication mode as well, it is possible that the operating voltage for the secondary signal processing part is taken from the back stage of the backflow prevention diode $D_1$.

A contactless power reception circuit according to a third exemplary embodiment will now be described with reference to FIG. 6. The third exemplary embodiment differs from the first exemplary embodiment in the point that a backup smoothing capacitor $C_2$ is provided in the front stage of a backflow prevention switch $SW_1$. Hereafter, the same reference numerals are used for a similar configuration to the first exemplary embodiment, and a detailed description of such parts is provided above.

Figure 6:
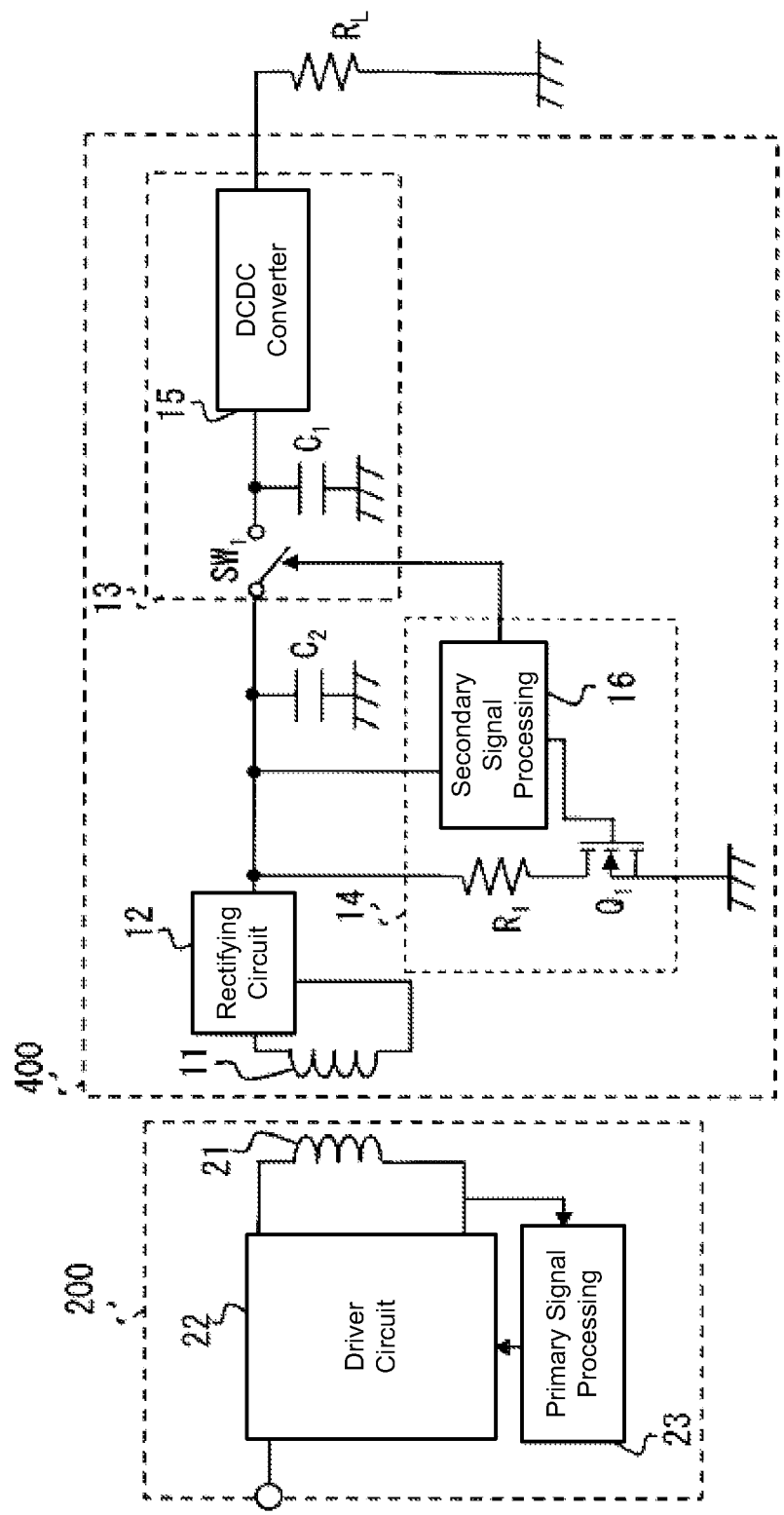
FIG. 6 is a schematic diagram of a contactless power transmission system comprising a contactless power reception circuit and a contactless power transmission circuit according to a third exemplary embodiment.

FIG. 6 is a schematic diagram of a contactless power transmission system comprising a contactless power reception circuit 400 and a contactless power transmission circuit 200.

The contactless power reception circuit 400 includes a coil antenna 11, a rectifying circuit 12, a voltage transforming circuit 13, a load modulation circuit 14 and a backup smoothing capacitor $C_2$.

The backup smoothing capacitor $C_2$ is provided at one end thereof at a point between the load modulation circuit 14 and the transforming circuit 13, and at another end thereof at ground. In the case of this configuration, a half-wave rectified signal is smoothed at the backup smoothing capacitor $C_2$ and the input smoothing capacitor $C_1$, and is input to the DCDC converter 15 during the power transmission mode. Meanwhile, the backflow prevention switch $SW_1$ is switched to OFF during the load modulation communication mode, therefore a connection between the backup smoothing capacitor $C_2$ and the input smoothing capacitor $C_1$ is disconnected electrically. Thereby, a backflow of a charge from the input smoothing capacitor $C_1$ is prevented. However, a charge from the backup smoothing capacitor $C_2$ flows backward. Therefore, the capacitance value of the backup smoothing capacitor $C_2$ can be set sufficiently smaller than the capacitance value of the input smoothing capacitor $C_1$ such that the amount of the backflow charge is suppressed and the waveform deformation is not brought in.

As described above, by providing the backup smoothing capacitor $C_2$ in addition to the input smoothing capacitor $C_1$, performing a fine adjustment of the voltage waveform becomes possible.

FIGS. 7A and 7B are graphs showing changes of the voltage level at the coil antenna 21, comparing that of the power transmission system according to the third exemplary embodiment with that of the first exemplary embodiment.

FIG. 7A shows changes of voltage level at the coil antenna 21 of a comparing example which does not include the backup smoothing capacitor $C_2$. FIG. 7B shows changes of voltage level at the coil antenna 21 with the configuration of the present embodiment which includes the backup smoothing capacitor $C_2$. Herein, exemplary component values are used, for example, the ON/OFF control of the load modulation switch Q1 is set to duty-cycle 0.5, the data rate of the load modulation is set to 2 kbps and the load modulation resistor $R_1$ is set to 20Ω.

FIG. 7A shows an example with the configuration for comparing in which the backup smoothing capacitor $C_2$ is not provided but the input smoothing capacitor $C_1$ of 50 μF is provided. Hence, ringing appears at the voltage drop part due to transient response. Meanwhile, FIG. 7B shows an example with the configuration according to the present embodiment in which the backup smoothing capacitor $C_2$ of 0.5 μF and the input smoothing capacitor $C_1$ of 49.5 μF are provided. Hence, the ringing at the voltage drop part is eliminated.

Two capacitors of the backup smoothing capacitor $C_2$ and the input smoothing capacitor $C_1$ are provided in parallel in this embodiment. In some preferable embodiments more than two capacitors can be connected in parallel as well.

A contactless power reception circuit according to a forth exemplary embodiment will now be described with reference to FIG. 8. The forth exemplary embodiment differs from the first exemplary embodiment in the point that a capacitor of large capacitance value is provided in the back stage of the DCDC converter. Hereafter, the same reference numerals are used for a similar configuration to the first exemplary embodiment, and a detailed description of such parts is provided above.

Figure 8:
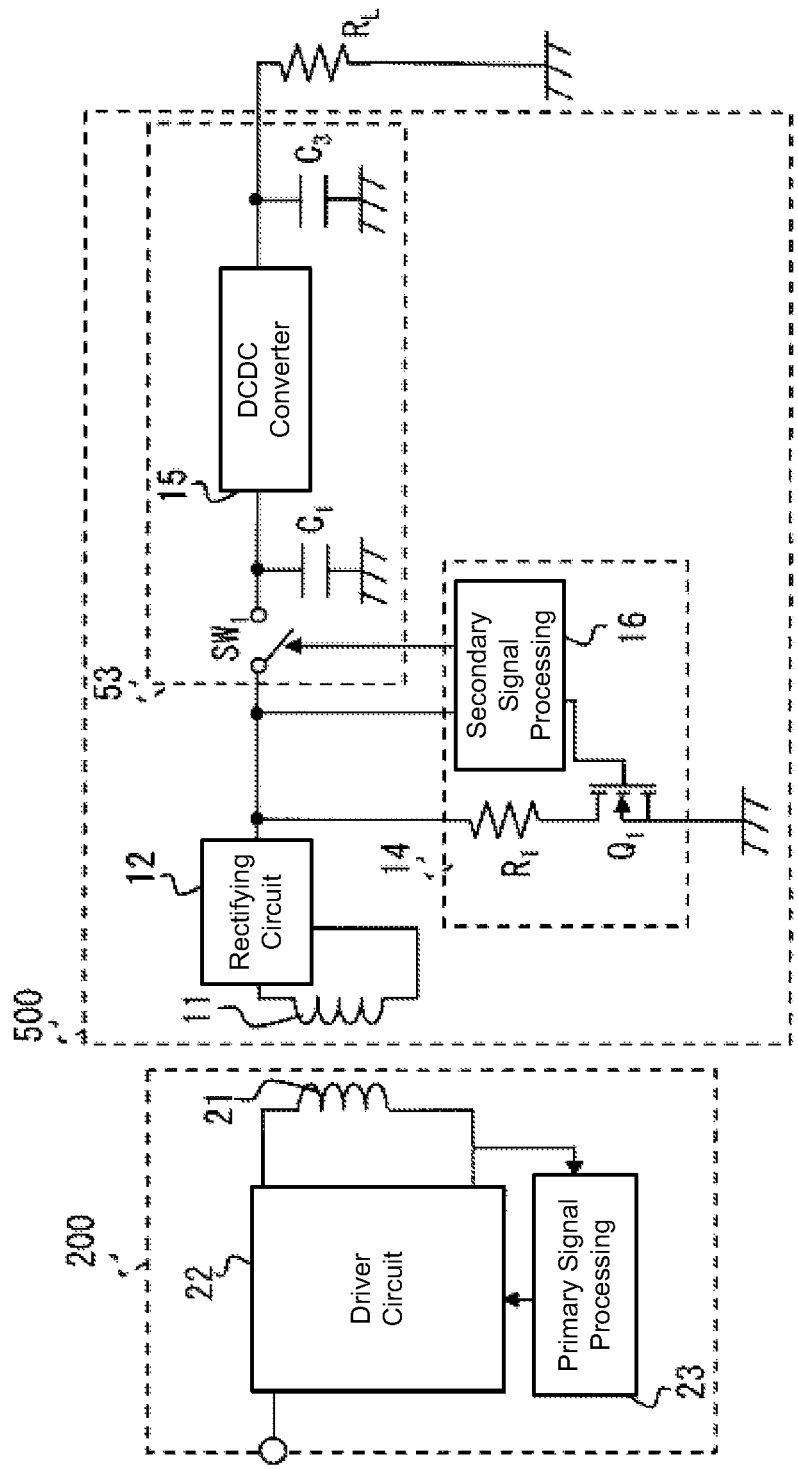
FIG. 8 is a schematic diagram of a contactless power transmission system comprising a contactless power reception circuit and a contactless power transmission circuit according to a forth exemplary embodiment.

FIG. 8 is a schematic diagram showing a contactless power transmission system comprising a contactless power reception circuit 500 and a contactless power transmission circuit 200.

The contactless power reception circuit 500 includes a coil antenna 11, a rectifying circuit 12, a voltage transforming circuit 53 and a load modulation circuit 14. The voltage transforming circuit 53 is a voltage transforming part according to the present embodiment and includes a backflow prevention switch $SW_1$ as the backflow prevention device, an input smoothing capacitor $C_1$, a DCDC converter 15 and a capacitor $C_3$ of large capacitance value. The capacitor $C_3$ of large capacitance value is provided at one end thereof at a point between the DCDC converter 15 and the power reception load $R_L$, and at another end thereof at ground.

When the connection between the load modulation circuit 14 and the DCDC converter 15 is disconnected by the backflow prevention switch $SW_1$ during the load modulation communication mode, supplying power to the DCDC converter 15 is stopped during the load modulation communication mode. In order to ensure supplying power to the power reception load $R_L$ during the load modulation communication mode, the capacitor $C_3$ of large capacitance value is used, for example, an electric double layer capacitor having capacitance value larger than the input smoothing capacitor, for example, as large as several ten thousands μF. Thereby, since charging up the capacitor $C_3$ of large capacitance value is conduced during the power transmission mode, even if power supplying to the DCDC converter 15 is stopped during the load modulation communication mode, power supplying to the power reception load $R_L$ from the capacitor $C_3$ of large capacitance value is ensured.

An embodiment using the backflow prevention switch $SW_1$ as a backflow prevention device has been described. Providing the capacitor $C_3$ of large capacitance value is suitable when a backflow prevention diode $D_1$ is used as a backflow prevention device as well. Although power supplying to the DCDC converter 15 becomes unstable during the load modulation communication mode in case the diode is used as a means for backflow prevention, power supplying to the power reception load $R_L$ can be stabilized by providing the capacitor $C_3$ of sufficiently large capacitance value.

A contactless power reception circuit according to a fifth exemplary embodiment will now be described with reference to FIG. 9. The fifth exemplary embodiment differs from the first exemplary embodiment in the point that a power-reception-load cutoff switch is provided in the back stage the DCDC converter. Hereafter, the same reference numerals are used for a similar configuration to the first exemplary embodiment, and a detailed description of such parts is provided above.

Figure 9:
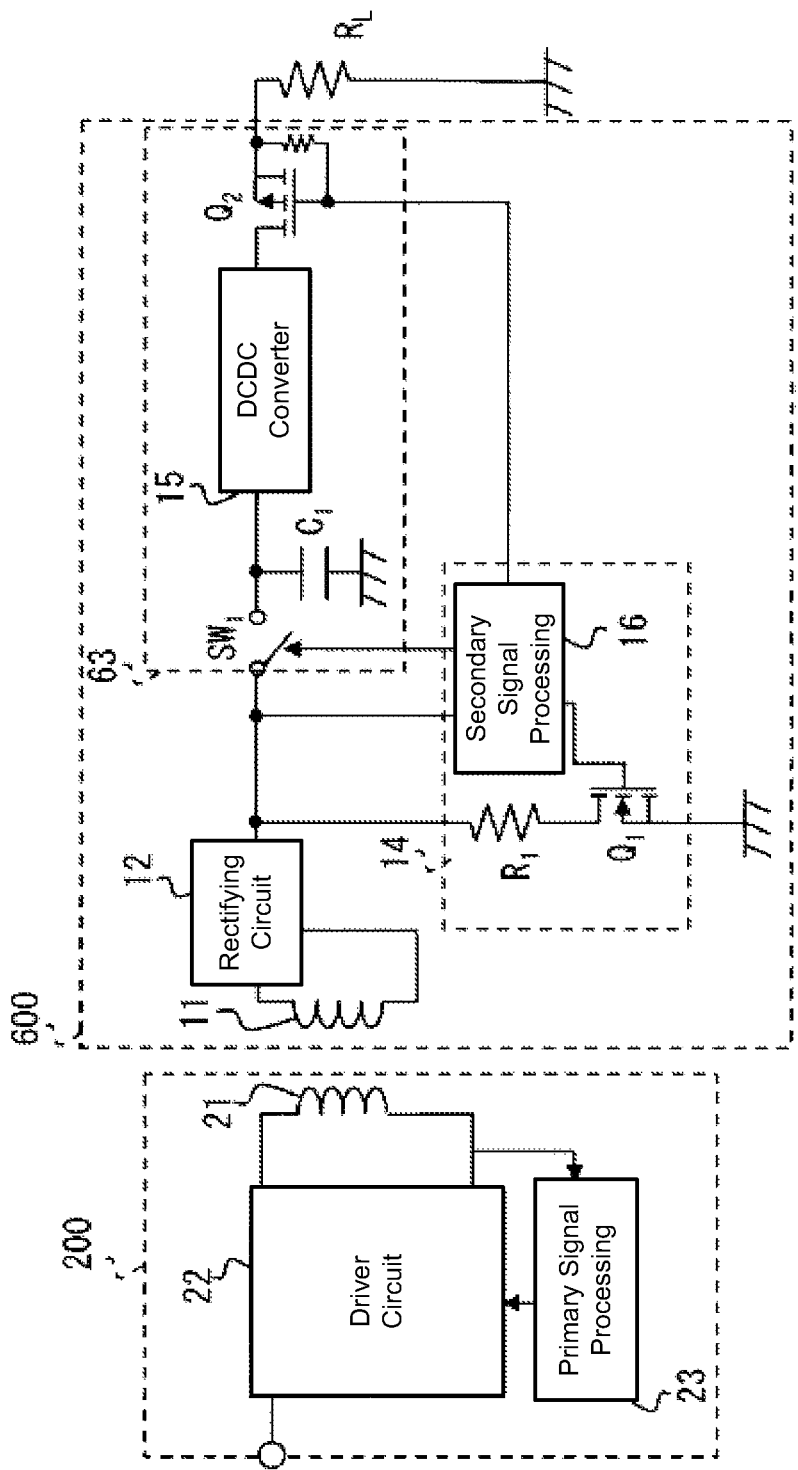
FIG. 9 is a schematic diagram of a contactless power transmission system comprising a contactless power reception circuit and a contactless power transmission circuit according to a fifth exemplary embodiment.

FIG. 9 is a schematic diagram showing a contactless power transmission system comprising a contactless power reception circuit 600 and a contactless power transmission circuit 200.

The contactless power reception circuit 600 includes a coil antenna 11, a rectifying circuit 12, a voltage transforming circuit 63 and a load modulation circuit 14. The voltage transforming circuit 63 is a voltage transforming part according to the present embodiment and includes a backflow prevention switch $SW_1$ as a backflow prevention device, an input smoothing capacitor $C_1$, a DCDC converter 15 and a power-reception-load cutoff switch $Q_2$.

Since the connection between the power reception load $R_L$ and the contactless power reception circuit 600 can be cut off by the power-reception-load cutoff switch $Q_2$ a consumption of the electromotive force generated by the rechargeable battery at the contactless power reception circuit 600 is suppressed. By switching power-reception-load cutoff switch $Q_2$ to OFF when a rechargeable battery of the power reception load $R_L$ is not charged, that is except during the power transmission mode, power consumption at a secondary terminal side is suppressed.

The present disclosure describes exemplary embodiments in various configurations above. Each configuration of these exemplary embodiments can be combined as well. For example, combining characterized configurations described in the third to the fifth exemplary embodiments to the configuration of the first exemplary embodiment appropriately will perform well. Combining characterized configurations described in the third to the fifth exemplary embodiments to the configuration of the second exemplary embodiment appropriately will perform well too.

In accordance with embodiments described herein, a heat generation is suppressed by using DCDC converter even if a contactless power supply of a large amount of power is conducted. Further, by providing an input smoothing capacitor, input signal to the DCDC converter is stabilized and stable operation of the DCDC converter is achieved. In this case, by providing a means for backflow prevention between the load modulation part and the input voltage smoothing capacitor, the waveform deformation during the load modulation communication is suppressed and an increasing of communication error and a decreasing of transmission rate are suppressed. Accordingly, since it is not necessary to decrease resistance of the load modulation resistor of the contactless power reception circuit or to connect resistors of the load modulation in parallel, the power consumption is suppressed and enlargement of the size and the increase in the cost can be avoided.

Additionally, it was conventionally required to design resistance value of the load modulation resistor corresponding to an input impedance of the DCDC converter and a design cost was needed for each DCDC converter having different input impedances. According to embodiments of the disclosure, a resistance value of a load modulation resistor can be designed without depending on the input impedance of the DCDC converter.

Also, the various disclosed embodiments provide flexibility in design. For example, in an embodiment in which a diode for the backflow prevention device instead of a switch, control can be simplified because switching control is not required for the diode, whereas a switch for preventing backflow would require switching control.

It should be understood that the above-described embodiments are illustrative only and that variations and modifications will be apparent to those skilled in the art without departing from the scope and spirit of the disclosure. The scope of the present invention should be determined in view of the appended claims and their equivalents.

The invention claimed is:

1. A contactless power reception circuit, comprising:
   a power reception part couplable with an adjacent electromagnetic field of a contactless power transmission circuit;
   a voltage rectifying part configured to rectify a voltage from the power reception part;
   a voltage transforming part configured to transform rectified voltage from the voltage rectifying part and supply the transformed voltage to a power reception load; and
   a load modulation part configured to change total impedance in the contactless power reception circuit by conducting load modulation while signals are transmitted to the contactless power transmission circuit, wherein
   the voltage transforming part includes a DCDC converter that transforms rectified voltage from the voltage rectifying part, a smoothing capacitor that smoothes the rectified voltage, and a backflow preventing device configured to prevent backflow of charge from the smoothing capacitor while the signals are transmitted.

2. The contactless power reception circuit according to claim 1, wherein
   the load modulation part includes a load modulation resistor of which a first end is connected between the voltage rectifying part and the voltage transforming part; a switch for the load modulation provided between a second end of the load modulation resistor and ground; and a signal processing part configured to obtain a driving voltage from a point between the voltage rectifying part and the voltage transforming part, and to conduct switching of the switch for the load modulation.

3. The contactless power reception circuit according to claim 1, wherein
a backup smoothing capacitor having one terminal thereof provided between the load modulation part and the voltage transforming part, and another terminal thereof provided at ground.

4. The contactless power reception circuit according to claim 2, wherein
a backup smoothing capacitor having one terminal thereof provided between the load modulation part and the voltage transforming part, and another terminal thereof provided at ground.

5. The contactless power reception circuit according to claim 1, wherein
a capacitor having a capacitance value larger than the smoothing capacitor, and having one terminal thereof provided between the voltage transforming part and the power reception load and another terminal thereof provided at ground.

6. The contactless power reception circuit according to claim 2, wherein
a capacitor having a capacitance value larger than the smoothing capacitor, and having one terminal thereof provided between the voltage transforming part and the power reception load and another terminal thereof provided at ground.

7. The contactless power reception circuit according to claim 3, wherein
a capacitor having a capacitance value larger than the smoothing capacitor, and having one terminal thereof provided between the voltage transforming part and the power reception load and another terminal thereof provided at ground.

8. The contactless power reception circuit according to claim 4, wherein
a capacitor having a capacitance value larger than the smoothing capacitor, and having one terminal thereof provided between the voltage transforming part and the power reception load and another terminal thereof provided at ground.

9. The contactless power reception circuit according to claim 1, wherein
the backflow prevention device is a backflow prevention switch which disconnects electrical connection between the voltage rectifying part and the voltage transforming part while the signals are transmitted.

10. The contactless power reception circuit according to claim 2, wherein
the backflow prevention device is a backflow prevention switch which disconnects electrical connection between the voltage rectifying part and the voltage transforming part while the signals are transmitted.

11. The contactless power reception circuit according to claim 3, wherein
the backflow prevention device is a backflow prevention switch which disconnects electrical connection between the voltage rectifying part and the voltage transforming part while the signals are transmitted.

12. The contactless power reception circuit according to claim 4, wherein
the backflow prevention device is a backflow prevention switch which disconnects electrical connection between the voltage rectifying part and the voltage transforming part while the signals are transmitted.

13. The contactless power reception circuit according to claim 5, wherein
the backflow prevention device is a backflow prevention switch which disconnects electrical connection between the voltage rectifying part and the voltage transforming part while the signals are transmitted.

14. The contactless power reception circuit according to claim 6, wherein
the backflow prevention device is a backflow prevention switch which disconnects electrical connection between the voltage rectifying part and the voltage transforming part while the signals are transmitted.

15. The contactless power reception circuit according to claim 7, wherein
the backflow prevention device is a backflow prevention switch which disconnects electrical connection between the voltage rectifying part and the voltage transforming part while the signals are transmitted.

16. The contactless power reception circuit according to claim 8, wherein
the backflow prevention device is a backflow prevention switch which disconnects electrical connection between the voltage rectifying part and the voltage transforming part while the signals are transmitted.

17. The contactless power reception circuit according to claim 1, wherein
the backflow prevention device is a backflow prevention diode which prevents a backflow of a charge from the voltage transforming part to the voltage rectifying part.

18. A contactless power transmission system comprising;
a contactless power reception circuit according to claim 1; and
a contactless power transmission circuit configured to generate the adjacent electromagnetic field and detect transmission signal from the contactless power reception circuit based on a change of the adjacent electromagnetic field.

* * * * *